US006721022B1

(12) United States Patent
Wang

(10) Patent No.: US 6,721,022 B1
(45) Date of Patent: Apr. 13, 2004

(54) LIQUID CRYSTAL DISPLAY WITH ELECTRO-LUMINESCENT CELL HAVING A DOUBLE-FACE BACKLIGHT EFFECT

(75) Inventor: Chih Yuan Wang, Taichung Hsien (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 10/293,289

(22) Filed: Nov. 14, 2002

(51) Int. Cl.⁷ .............................................. G02F 1/1335
(52) U.S. Cl. .......................................... 349/69; 348/65
(58) Field of Search ............................ 349/61, 62, 64, 349/65, 67, 68, 69; 362/31, 26

(56) References Cited

U.S. PATENT DOCUMENTS 6,561,660 B2 * 5/2003 Huang .......................... 362/27
6,598,989 B2 * 7/2003 Huang .......................... 362/31

\* cited by examiner

Primary Examiner—Kenneth Parker
Assistant Examiner—David Y. Chung
(74) Attorney, Agent, or Firm—Rosenberg, Klein & Lee

(57) ABSTRACT

Liquid crystal display with electro-luminescent cell having double-face backlight effect, including a transparent substrate and two lighting units disposed on the substrate at intervals. The transparent substrate is made of soft material and has a flexible section between the two lighting units. By means of bending the flexible section, the first transparent section and second transparent section of the transparent substrate respectively corresponding to the two lighting units can be respectively attached to two opposite faces of the liquid crystal display module. The front and back electrode layers of the lighting units serve to control the lighting layers of the lighting units to emit light. The light beams emitted from the lighting layers are respectively projected out through the first and second transparent sections to provide double-face backlight effect for the liquid crystal display module.

4 Claims, 5 Drawing Sheets

LIQUID CRYSTAL DISPLAY WITH ELECTRO-LUMINESCENT CELL HAVING A DOUBLE-FACE BACKLIGHT EFFECT

BACKGROUND OF THE INVENTION

The present invention is related to a liquid crystal display with electro-luminescent cell (EL) having double-face backlight effect, and more particularly to a liquid crystal display including single electro-luminescent cell for providing double-face backlight effect for a liquid crystal display module.

Electro-luminescent cell (EL) is applicable to backlight element, advertisement sign, decorative article, etc.

Referring to FIG. 3, the EL 8 is a thin sheet including a transparent substrate 81, a front electrode layer 82, a lighting layer 83, a back electrode layer 84 and an insulating packaging layer 85 sequentially overlaid on the substrate 81. An AC voltage is applied between the front electrode layer 82 and the back electrode layer 84 to make the lighting layer 83 emit light which is projected out through the transparent substrate 81.

The above EL 8 can only provide backlight effect on one single face in the same lighting area. When applied to mobile phone with double panels, such as Motorola V60, two ELs are necessary to provide backlight effect on both faces. Please refer to FIGS. 4 and 5 which show the double-face liquid crystal display of Motorola V60. Two EL 8A, 8B are respectively disposed on two faces of a liquid crystal display module 9 in cooperation with a circuit board 95. The two EL 8A, 8B co-use the liquid crystal display module 9. Therefore, it is necessary to form perforations 86A, 86B on the EL 8A, 8B, whereby the light of EL 8A can pass through the liquid crystal display module 9 and go out through the perforation 86B, while the light of EL 8B can pass through the liquid crystal display module 9 and go out through the perforation 86A to achieve double-face display effect.

According to the above structure, it is necessary to previously manufacture two kinds of molds for producing two sheets of EL 8A, 8B with different sizes of perforations 86A, 86B. Then the two sheets of EL 8A, 8B are aligned and assembled with the liquid crystal display module 9 as shown in FIG. 5. Such procedure leads to increase manufacturing cost. Moreover, the perforations 86A, 86B of the EL 8A, 8B do not emit light. According to calculation, in the above structure, the non-lighting area is about 1.2 times the lighting area. Apparently, a considerable amount of material is wasted. Moreover, when assembled, it is necessary to align the two EL 8A, 8B. This is troublesome and time-consuming and inaccurate backlight position may be resulted from inaccurate alignment.

SUMMARY OF THE INVENTION

It is therefore a primary object of the present invention to provide a liquid crystal display with electro-luminescent cell having double-face backlight effect. The transparent substrate of the electro-luminescent cell is made of soft material and has a flexible section between the two lighting units. By means of bending the flexible section, the first transparent section and second transparent section of the transparent substrate respectively corresponding to the two lighting units can be respectively attached to two opposite faces of the liquid crystal display module. The light beams emitted from the lighting layers are respectively projected out through the first and second transparent sections to provide double-face backlight effect for the liquid crystal display module. The above electro-luminescent cell can provide double-face backlight effect instead of the two electro-luminescent cells in the conventional technique. Therefore, the material is saved and the working time is shortened.

The present invention can be best understood through the following description and accompanying drawings wherein:

DETAILED DESCRIPTION OF THE PREFERRED EMBODIMENTS

Figure 1:
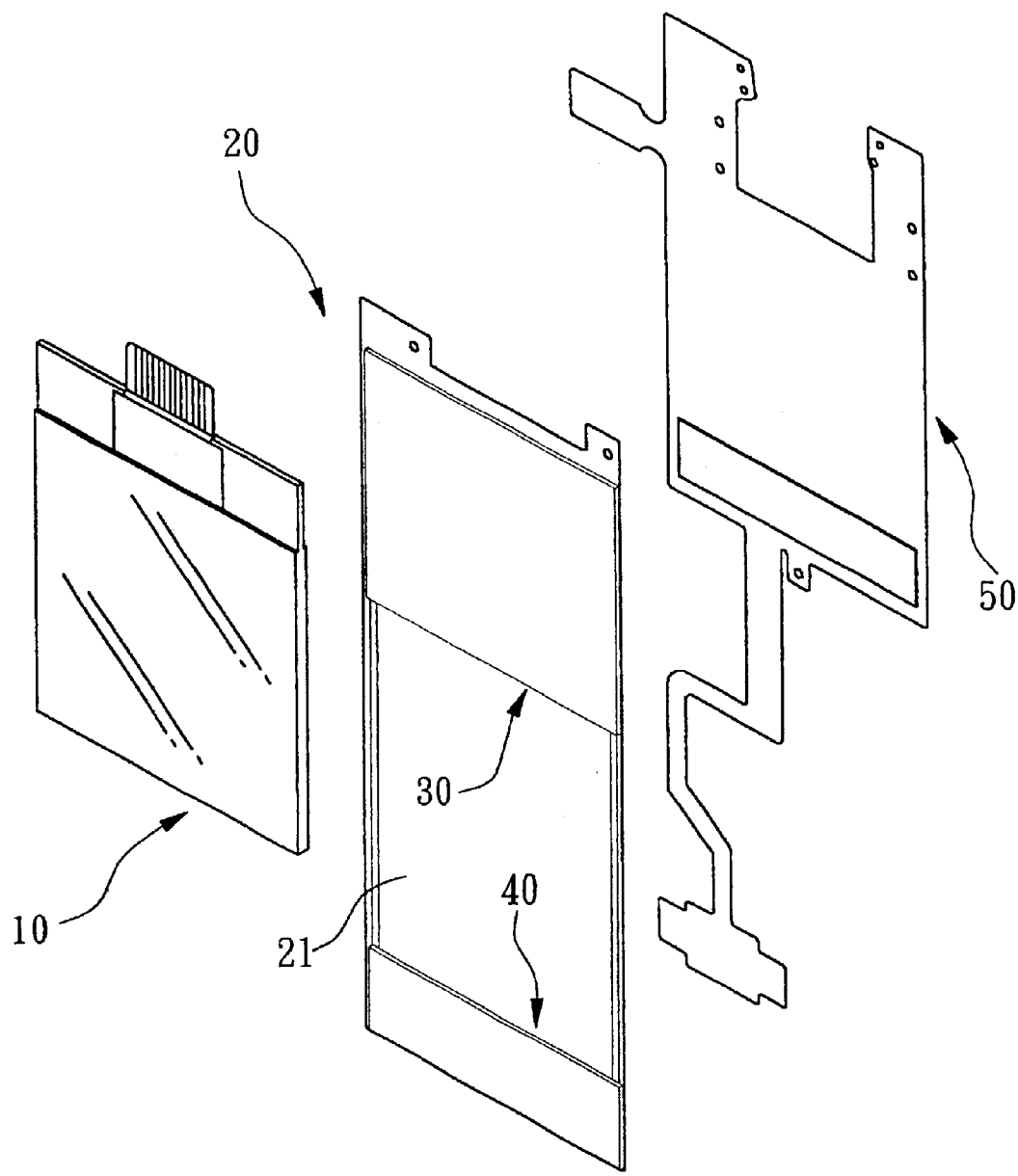
FIG. 1 is a structurally exploded view of the present invention applied to double-face liquid crystal display of Motorola V60 mobile phone.
Figure 2:
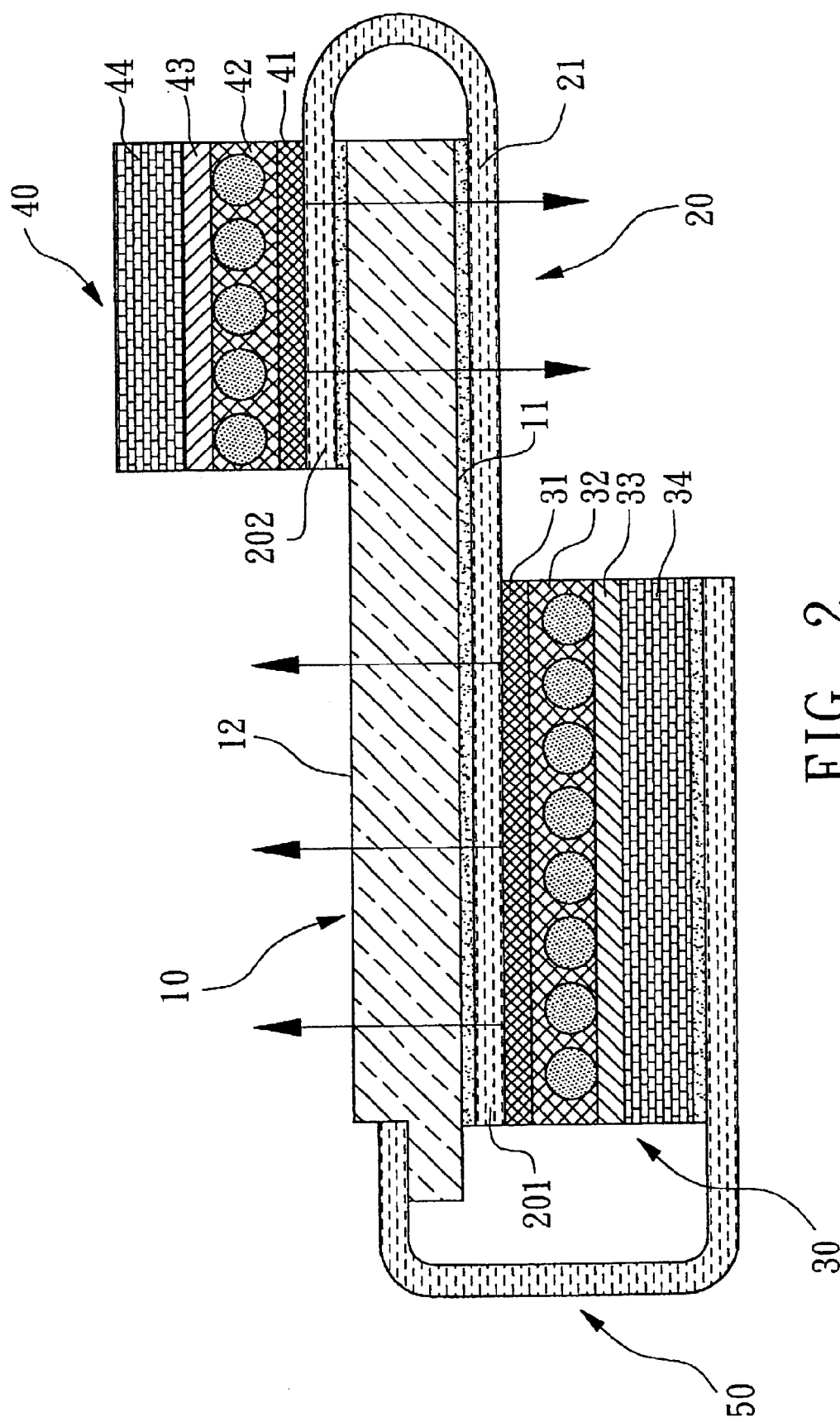
FIG. 2 is a sectional view of the present invention combined with a liquid crystal display module.
Figure 3:
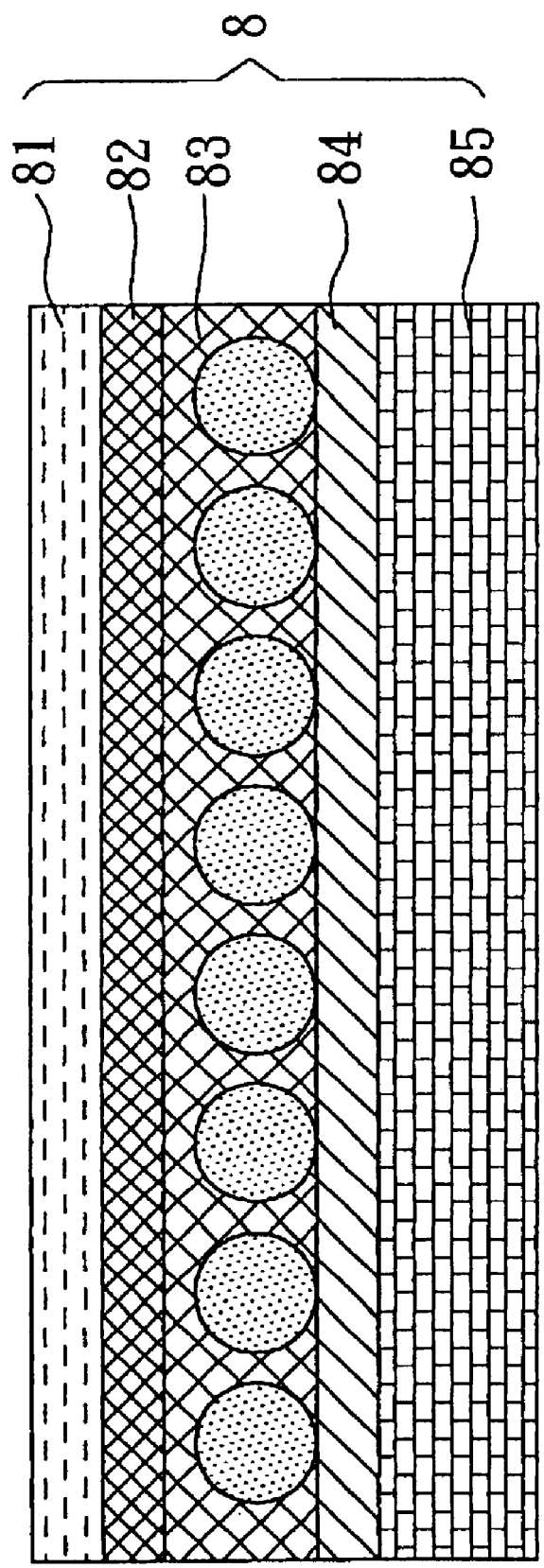
FIG. 3 shows the structure of a conventional electro-luminescent cell.
Figure 4:
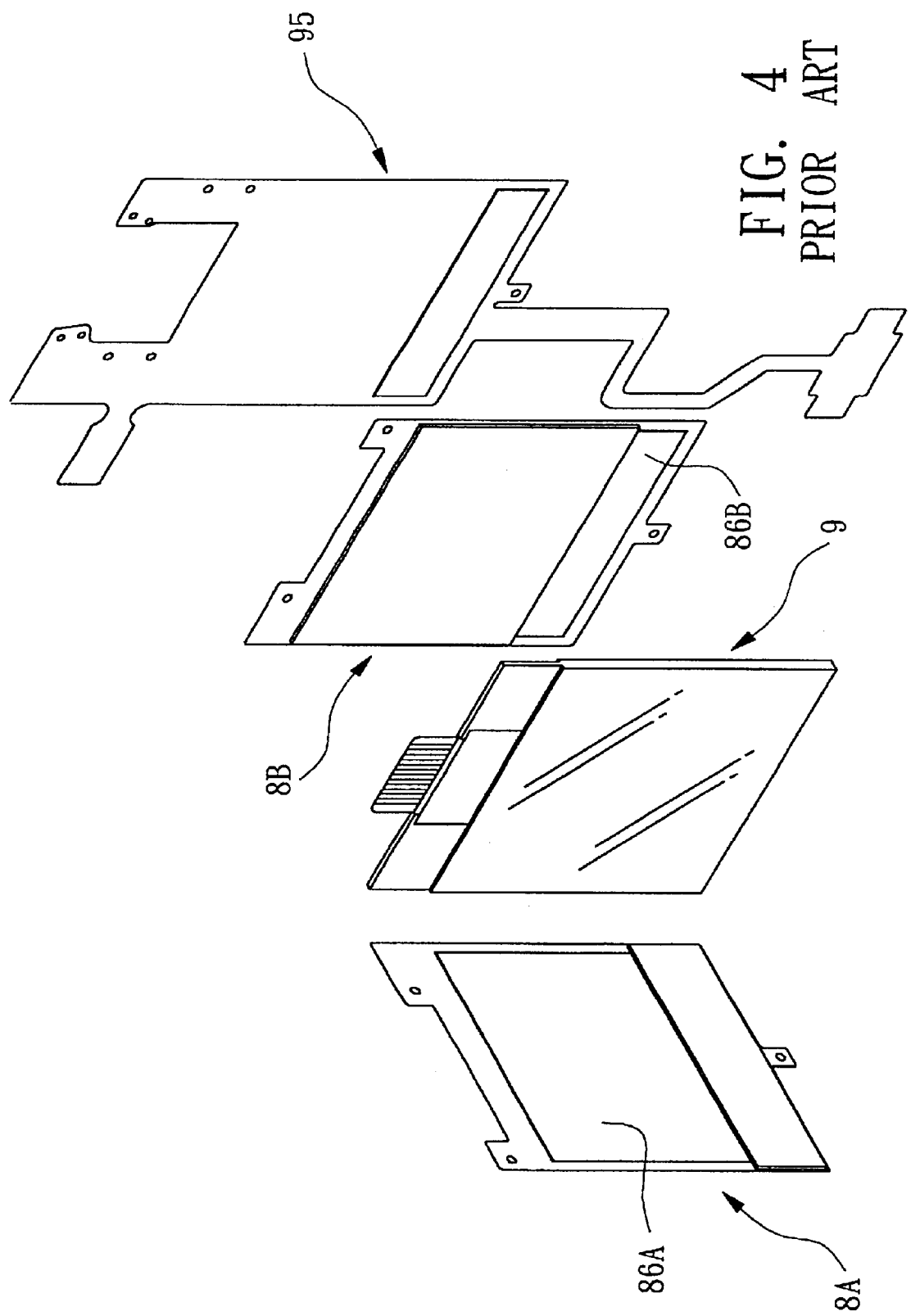
FIG. 4 is a structurally exploded view of the double-face liquid crystal display of Motorola V60 mobile phone.
Figure 5:
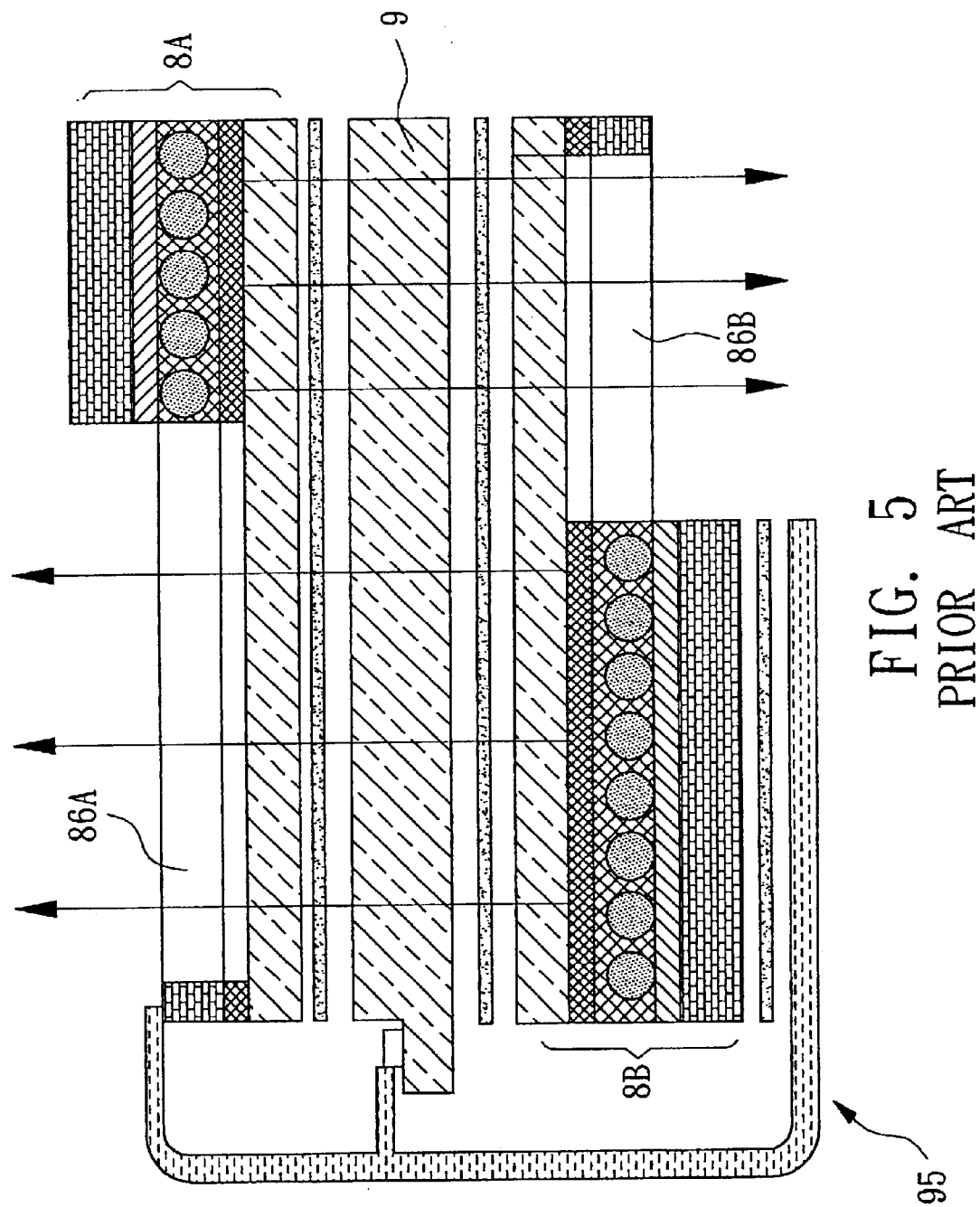
FIG. 5 is a sectional view of the double-face liquid crystal display of Motorola V60 mobile phone.

Please refer to FIGS. 1 and 2. The liquid crystal display with electro-luminescent cell having double-face backlight effect of the present invention includes a liquid crystal display module 10, a transparent substrate 20 and two lighting units 30, 40 disposed on the substrate 20. The liquid crystal display module 10 is connected to the two lighting units 30, 40 via a circuit board 50.

The transparent substrate 20 is made of soft material with flexibility. The lighting units 30, 40 are arranged on the transparent substrate 20 at intervals, whereby a section of the transparent substrate 20 between the lighting units 30, 40 forms a flexible section 21. Two sections of the transparent substrate 20 corresponding to the lighting units 30, 40 are respectively defined as a first transparent section 201 and a second transparent section 202. By means of bending the flexible section 21, the first transparent section 201 and second transparent section 202 can be respectively attached to a bottom face 11 and a top face 12 of the liquid crystal display module 10.

Each of the lighting units 30, 40 includes a front electrode layer 31, 41, a lighting layer 32, 42, a back electrode layer 33, 43 and a packaging layer 34, 44 sequentially overlaid on the substrate 20. The front and back electrode layers 31, 41, 33, 43 of the lighting units 30, 40 are connected with each other. The front and back electrode layers 31, 41, 33, 43 serve to control the lighting layers 32, 42 of the lighting units 30, 40 to emit light. The light beams emitted from the lighting layers 32, 42 are respectively projected out through the first and second transparent sections 201, 202.

By means of bending the flexible section 21 of the transparent substrate 20, the first transparent section 201 and second transparent section 202 can be respectively attached to the bottom face 11 and top face 12 of the liquid crystal display module 10 as shown in FIG. 2. Accordingly, the front and back electrode layers 31, 41, 33, 43 serve to control the lighting layers 32, 42 of the lighting units 30, 40 to emit light and provide double-face backlight effect for the liquid crystal display module 10.

According to the above structure, it is no more necessary to process two sheets of EL as in the conventional technique. Therefore, the cost for the molds is saved. Moreover, in the present invention, the non-lighting area is only 0.1 time the lighting area. In comparison to the conventional structure, apparently, a considerable amount of material is saved. Moreover, it is unnecessary to align the two ELs so that the working time is shortened.

The above embodiment is only used to illustrate the present invention, not intended to limit the scope thereof. Many modifications of the above embodiment can be made without departing from the spirit of the present invention. For example, the two lighting units can have different colors.

What is claimed is:

1. A liquid crystal display with electro-luminescent cell having double-face backlight effect, comprising a liquid crystal display module, a transparent substrate and two lighting units disposed on the substrate, the transparent substrate being made of soft material with flexibility, the lighting units being arranged on the transparent substrate at intervals, whereby a section of the transparent substrate between the lighting units forms a flexible section, two sections of the transparent substrate corresponding to the lighting units being respectively defined as a first transparent section and a second transparent section, whereby by means of bending the flexible section, the first transparent section and second transparent section can be respectively attached to two opposite faces of the liquid crystal display module, each of the lighting units including a front electrode layer, a lighting layer, a back electrode layer and a packaging layer which are sequentially overlaid on the substrate, the front and back electrode layers serving to control the lighting layers of the lighting units to emit light, the light beams emitted from the lighting layers being respectively projected out through the first and second transparent sections.

2. The liquid crystal display with electro-luminescent cell having double-face backlight effect as claimed in claim 1, wherein each lighting layer is composed of more than one lighting powder and more than one resin.

3. The liquid crystal display with electro-luminescent cell having double-face backlight effect as claimed in claim 1, wherein the light beams emitted by the lighting layers have the same color.

4. The liquid crystal display with electro-luminescent cell having double-face backlight effect as claimed in claim 1, wherein the lighting layers are respectively blended with different colors of materials so that the light beams emitted by the lighting layers have different colors.

* * * * *